Figure 1:
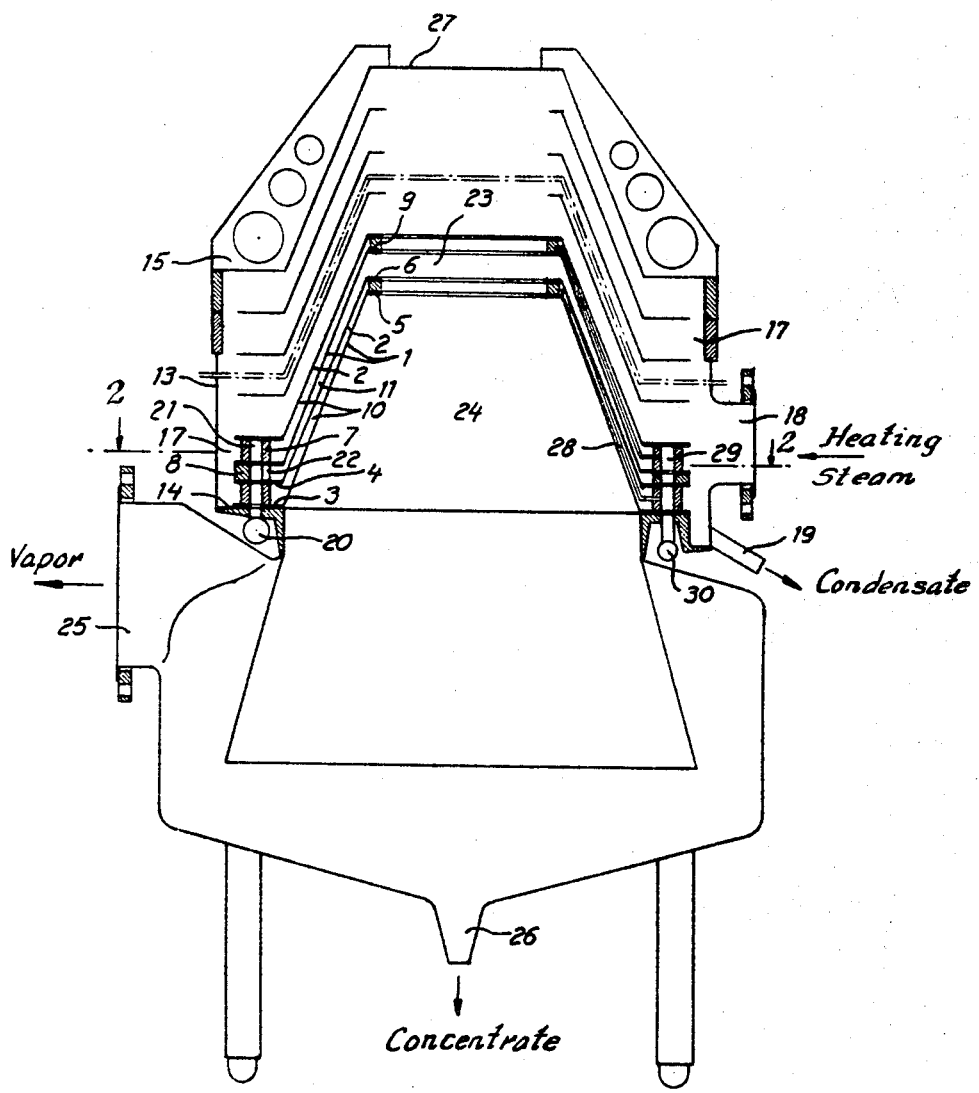

INVENTORS
Rolf Axel Dönell
Björn-Olow Johansson

By Davis, Hoxie, Faithfull & Hapgood
ATTORNEYS

3,412,777
FRUSTO-CONICAL FILM TYPE EVAPORATOR

Rolf Axel Dönell, Lund, and Björn-Olow Johansson, Lomma, Sweden, assignors to Alfa-Laval AB, Tumba, Sweden, a corporation of Sweden
Filed July 13, 1966, Ser. No. 564,887
7 Claims. (Cl. 159—13)

This invention relates to the evaporation of liquids and has particular reference to an improved apparatus for that purpose.

During indirect and continuous evaporation of liquids in a heating apparatus in which the heating medium is kept apart from the liquid to be evaporated, the volume of the latter is decreased continuously and, at the same time, a continuously increasing quantity of vapor (secondary vapor) is formed. Conventional evaporators of this kind, such as tube evaporators and plate evaporators, have a heating surface which is of constant area in the direction of flow of the liquid to be evaporated, and a passage for the liquid which is constant in throughflow area. In such evaporators, therefore, it is difficult to get the liquid to cover or wet the whole heating surface at the end of the tube or plate reckoned in the direction of flow. At the same time, the quantity of secondary vapor is increased in the direction of flow, and this can give rise to fairly high velocities of the vapor in the outlet of the tube or plates. For these reasons, the ideal evaporator should have a heating surface that is decreasing in area in the direction of flow of the liquid to be evaporated, and a passage that is increasing in throughflow area in the same direction.

One of these conditions is fulfilled by the socalled conical evaporator, which comprises a series of conical plates threaded on to each other and forming channels between the plates, alternate channels serving for passage of the liquid to be evaporated, and the others for passage of the heating medium. As the flow proceeds through these channels from the larger to the smaller diameter, the heating surface is decreasing in area in the direction of flow but, at the same time, the passage throughflow area is decreasing too; and as flow occurs in the opposite direction, the heating surface area as well as the passage throughflow area are increasing.

The object of the present invention is to provide a continuously operating evaporator in which the channels for the liquid to be evaporated have a continuously decreasing area of heating surface in the direction of flow and, at the same time, an increasing throughflow passage area in the same direction.

An apparatus made according to the invention comprises a series of conical plates threaded on to each other and forming channels between the plates, alternate channels serving for passage of a liquid to be evaporated and the remaining channels serving for passage of a heating medium. At their larger or outer peripheries, the plates are rovided with two different kinds of spacers, those of one kind serving to close circumferentially the channels for the liquid to be evaporated, while the spacers of the other kind leave free openings along the periphery of the channels for the heating medium. At their inner or smaller peripheries, the conical plates are provided with spacers circumferentially closing the channels for the heating medium. The conical plates and spacers at the larger peripheries of the plates are ported to form an inlet for the liquid to be evaporated. This inlet, by means of side channels in the spacers, communicates with the channels for the liquid to be evaporated. A particularly important feature of the new apparatus is that the conical plates are of two kinds alternately threaded on to each other, the plates of one kind having such a conicity in relation to the conicity of the plates of the other kind that, when one plate of the one kind is threaded on to one plate of the other kind at the mutual distance determined by the spacers, a conical channel is formed between the plates, the distance between the conical plates increasing or decreasing in the direction from the larger diameter to the smaller diameter of the plates, depending upon which of the conical plates is threaded on to the other.

In one embodiment of the present invention, these two kinds of conical plates may have different apex angles. In another embodiment, the two kinds of conical plates may have a step-wise conicity, the step of the one kind of conical plates having a larger radial extension than the step of said other kind of conical plates.

Other characterizing features of the present invention and their advantages will be evident from embodiments of the invention described more in detail below with reference to the drawings.

Figure 2:
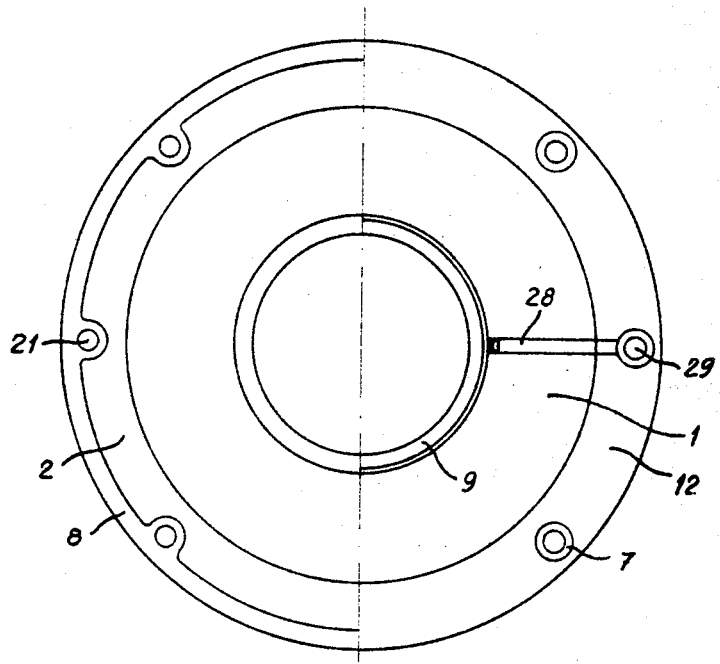
Figure 3:
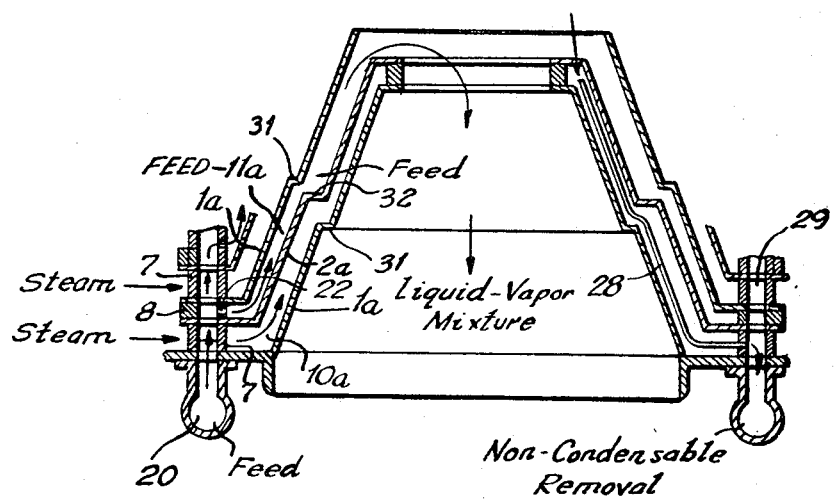

In the drawings, FIG. 1 is a vertical sectional view of one embodiment of the new evaporator; FIG. 2 is a horizontal sectional view of the same embodiment, the left-hand part of this figure showing a section between the conical plates of a channel for the liquid to be evaporated, and the right-hand part showing a corresponding section through a channel for the heating medium; and FIG. 3 is a vertical sectional view through an alternative embodiment of the evaporator with conical plates different from those of FIG. 1.

The evaporator according to FIGS. 1 and 2 comprises a series of conical plates threaded on to each other, of which plates each alternate plate 1 has an apex angle different from that of the other plates 2. At their outer or larger diameters, the plates 1 are provided with radially outwardly extending flanges 3, and plates 2 are provided with radially outwardly extending flanges 4. At their smaller or inner diameters, plates 1 are provided with radially inwardly extending flanges 5, and plates 2 are provided with radially inwardly extending flanges 6. Spacers in the form of gaskets 7 and 8 are provided between flanges 3 and 4, and spacers in the form of gaskets 9 are provided between flanges 5 and 6. The form of these spacers or gaskets 7, 8 and 9 is best seen in FIG. 2.

The conical plates together with their flanges and gaskets or spacers define channels 10 and 11, of which channels 10 are intended for passage of the heating medium and channels 11 are intended for passage of the liquid to be evaporated, in both cases in the direction from the large diameter to the small diameter. On account of the conicity of the plates, the heating surface decreases in area in the direction of flow of the liquid to be evaporated; and on account of the different conicity of the plates, the passage throughflow area increases in the same direction. As will be seen in the drawings, channels 11 are closed at their outer periphery and channels 10 are closed at their inner periphery; and channels 10 at their outer periphery are provided with openings 12 between adjacent spacers 7.

The conical plates 1 and 2 threaded on to each other are arranged in a housing 13 and are held pressed tightly against each other and at a mutual distance determined by the spacers. The pressure keeping the plates 1 and 2 together is exerted by opposite parts 14 and 15 of housing 13. The means holding these two housing parts together is not shown in the drawings. The housing 13 forms an annular chamber 17 around the radially outwardly extending flanges of the plates, and this chamber has an inlet 18 for the heating medium and an outlet 19 for condensate of the heating medium. If the heating medium is steam, it passes into chamber 17 through inlet 18, and from there it passes through openings 12 between spacers 7 into channels 10, where it is condensed and flows back the same way and out through outlet 19.

The liquid to be evaporated, generally milk or juice, is supplied through a conduit 20 and flows up through a chanel 21 formed by a bore in the housing, the spacers and the flanges of the conical plates. From the channel 21, radially inwardly directed passages 22 in spacers 8 lead to the aforementioned channels 11 from which the liquid to be evaporated in the form of secondary vapor and a concentrate of the liquid escapes through the openings around the periphery at the smaller diameter of the evaporating channels. From here, the mixture flows into an inner chamber 24 inside the conical plates, where the vapor is separated from the liquid, the vapor leaving through an outlet 25 and the concentrate leaving through a bottom outlet 26. Reference numeral 27 indicates a plate that closes chamber 24 at the top and separates it from the annular chamber 17.

The heating medium sometimes contains non-condensible gases. If these gases are not removed, they accumulate in the upper part of channels 10, where they would impair the heat exchange. Therefore, tubes 28 are arranged in channels 10, which are open at their upper end and are fixed to spacers 7 at their lower end, where they communicate with a channel 29 formed in the same way as channel 21 but separated from the same. Channel 29 communicates with an outwardly leading conduit 30 through which non-condensible gases thus can be removed from channels 10.

The embodiment shown in FIG. 3 differs from that in FIG. 1 only in the respect that the conical plates are shaped differently. In FIG. 3, the plates of both kinds have the same apex angle, but each of the conical plates is provided with steps. The plates 1a of the one kind have steps 31 that have smaller radial extension then steps 32 of the plates 2a of the other kind. By this arrangement, when the plates are threaded alternately on to each other, according to the invention, channel 11a for the liquid to be evaporated will have a smaller throughflow passage area at its larger diameter than at its smaller diameter, while the area of the heating surface decreases gradually in the same direction. Each plate may be provided with any desired number of steps; and in order to change the distance between the conical plates, the height of the spacers may be chosen according to requirements.

Without departing from the invention, the two kinds of conical plates shown in FIG. 1 may be provided with steps like those in FIG. 3.

We claim:

1. Apparatus for evaporating liquids, which comprises a series of frusto-conical plates nested together to form fluid-conveying channels between the plates and a central space within their inner peripheries, alternate channels serving for passage of a liquid to be evaporated, the other channels serving for passage of a vaporous heating medium, spacers of a first group located at the outer peripheries of the alternate channels and circumferentially sealing their peripheries, spacers of a second group located at the outer peripheries of said other channels and leaving free openings along said outer peripheries of said other channels between said last mentioned spacers for the passage thereinto of said vaporous heating medium, inner spacers located at the inner peripheries of the plates and circumferentially sealing said other heating medium channels, said conical plates and spacers at the outer peripheries of the plates being axially ported to form an inlet duct for the liquid to be evaporated and communicating with said alternate channels, the concentrate and released vapor passing through the inner unobstructed peripheries of said alternate channels to the central space within the inner peripheries, said conical plates being of two kinds alternating with each other, the plates of one kind having such a conicity relative to the conicity of the plates of the other kind that the distance between a pair of plates forming a said alternate channel increases in the direction from the outer to the inner diameters of the plates, while the distance between a pair of plates forming a said other channel decreases in said direction.

2. Apparatus according to claim 1, in which said two kinds of conical plates have different apex angles.

3. Apparatus according to claim 1, in which said two kinds of conical plates have a step-wise conicity, the step of one kind having a larger radial extension than the step of the other kind.

4. Apparatus according to claim 1, comprising also tubes in said other channels, each tube opening at one end into the radially inner portion of a said other channel and being fixed at its outer end to one of said spacers at the outer diameters of the plates, said tubes communicating through said outer spacers with an outlet.

5. Apparatus according to claim 1, in which the conical plates are provided at their outer diameters with radially outwardly extending flanges between which said spacers of the first and second groups are disposed, the apparatus comprising also a housing containing the plates, the housing having two parts which clamp together said outwardly extending flanges and the spacers therebetween, the housing forming an annular chamber outside said flanges and having an inlet for the heating medium.

6. Apparatus according to claim 5, in which said housing also forms a second chamber inside the inner diameters of the conical plates, said alternate channels at their inner diameters being in free communication with said second chamber, said second chamber having a bottom outlet for evaporated liquid and also having an upper outlet for secondary vapor formed by the evaporation.

7. Apparatus according to claim 5, in which said annular chamber has a bottom outlet.

References Cited
UNITED STATES PATENTS

| | | | |
|---|---|---|---|
| 1,197,944 | 9/1916 | Monters | 165—166 |
| 3,092,180 | 6/1963 | Dahlgren | 159—6 X |
| 3,241,598 | 3/1966 | Falkenblad | 159—28 |

NORMAN YUDKOFF, *Primary Examiner.*

J. SOFER, *Assistant Examiner.*